United States Patent [19]

Williams et al.

[11] 4,295,532

[45] Oct. 20, 1981

[54] PLANTER WITH COOPERATING TRASH CLEARING DISCS

[75] Inventors: Donald E. Williams; Forrest E. Robertson; C. Dean Gigot; Terry K. Gigot, all of Garden City, Kans.

[73] Assignee: Acra-Plant, Inc., Garden City, Kans.

[21] Appl. No.: 90,790

[22] Filed: Nov. 2, 1979

[51] Int. Cl.³ ............................................... A01C 5/06
[52] U.S. Cl. .................................... 172/184; 172/574; 172/763
[58] Field of Search ................................ 172/184–187, 172/574, 575, 180, 181, 151, 166, 510, 606, 603, 763; 111/88, 81, 86, 87

[56] References Cited

U.S. PATENT DOCUMENTS

| 448,349 | 3/1892 | King | 172/187 |
| 588,787 | 8/1897 | Atkins | 172/575 |
| 642,273 | 1/1900 | White | 172/575 |
| 736,963 | 8/1903 | Ham | 172/187 X |
| 2,486,442 | 11/1949 | Silver | 172/186 |
| 2,734,439 | 2/1956 | Padrick | 172/184 X |
| 2,757,593 | 8/1956 | Bowman | 172/603 |
| 3,362,361 | 1/1968 | Morrison | 172/1 |
| 3,642,333 | 2/1972 | Eisenhardt | 172/763 |
| 3,718,191 | 2/1973 | Williams | 172/196 |
| T862,011 | 5/1969 | Koronka | 172/575 X |

FOREIGN PATENT DOCUMENTS 913496  3/1960  United Kingdom ................. 111/87

Primary Examiner—Richard J. Johnson
Attorney, Agent, or Firm—Schmidt, Johnson, Hovey & Williams

[57] ABSTRACT

A double disc attachment for planters, operating to present a debris-cleared area ahead of the furrow opener of the planter, has one of the discs peripherally fluted so that the discs cooperate in their debris-clearing function rather than work in opposition to one another. The fluting permits lateral displacement by the other disc of debris which might otherwise be contacted simultaneously by the soil-penetrating cutter disc and left lying across the path of the oncoming furrow opener. The discs are properly oriented insofar as tilt, spacing, convergence, relative overlapping and lead are concerned, with at least certain of such relative positioning and depth being adjustable to accommodate for various conditions.

9 Claims, 7 Drawing Figures

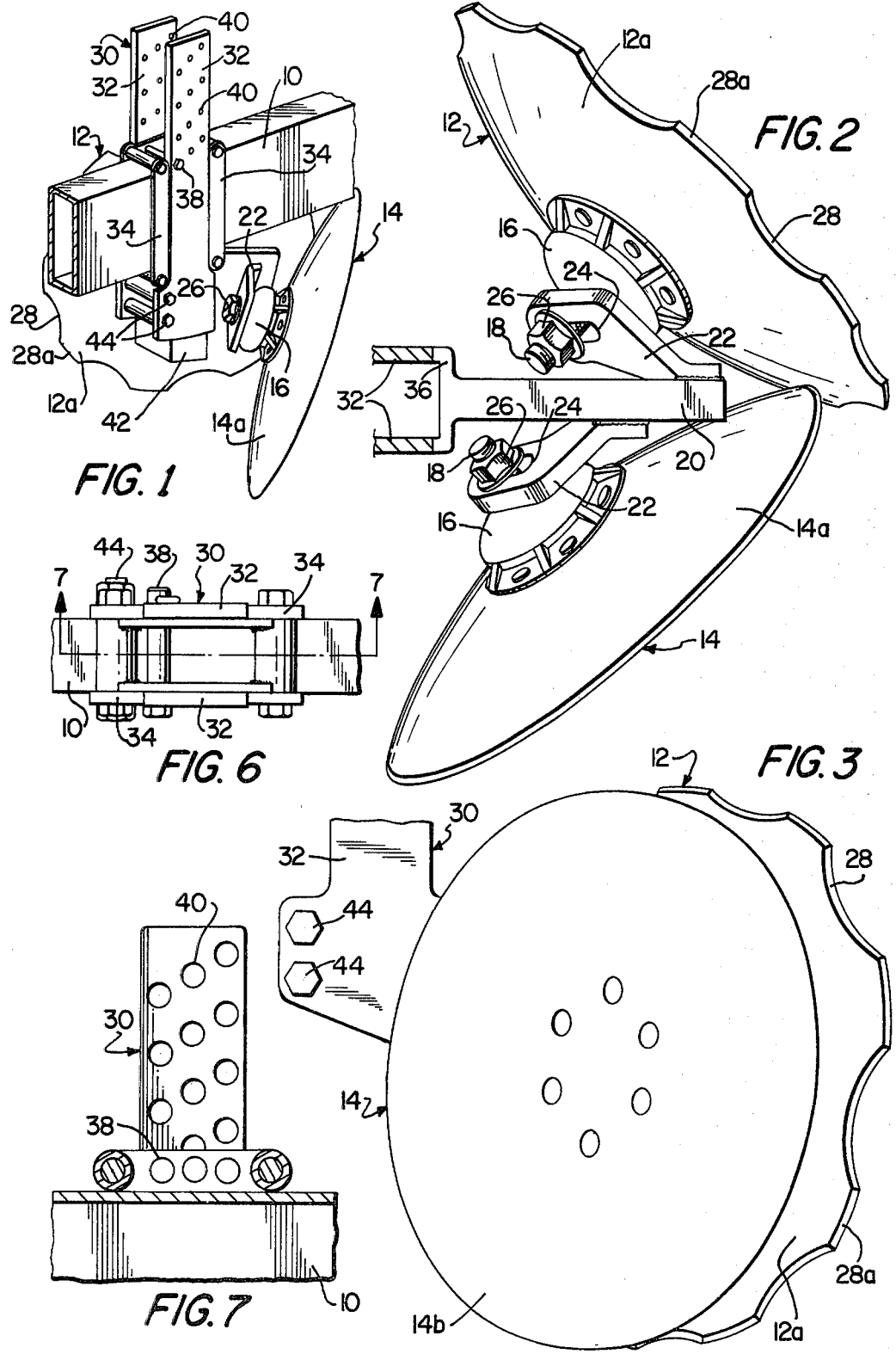

PLANTER WITH COOPERATING TRASH CLEARING DISCS

Our present invention relates to improvements on the single disc trash clearing attachment to furrow openers disclosed in U.S. Pat. No. 3,718,191 owned by the assignee hereof, but adapted herein to be used separately from and ahead of the furrow opener of a planting implement. Insofar as planters are concerned, we are familiar with U.S. Pat. Nos. 2,579,988 provided with dirt collecting discs, and 3,362,361 equipped with a pair of trash cutting and removing discs disposed in advance of a furrow-opening tool.

Rolling coulters for moldboard plows are known to be old as provided, for instance in U.S. Pat. Nos. 682,505; 2,683,404 and 3,115,192.

Other relevant prior art of lesser significance includes U.S. Pat. Nos. 747,754 having a disc-type marker; 2,706,362 relating to a trencher with an incising disc; 2,748,535 using drums and conveyors for cutting and moving trash or crop residue laterally in opposite directions; 2,757,593 disclosing a disc cultivator; and 2,842,078 directed to a furrow-opening disc.

Examples of furrow openers of the kind with which our instant invention may be used are disclosed in U.S. Pat. Nos. 3,154,030; 3,217,674 and 3,509,947, all owned by the assignee hereof, as well as 3,380,411 and 3,380,412.

The difficulty with single-disc cutters is that while they may well slice turf and cut through dirt clods, root systems, corn stalks and other crop residue, the trash either remains in or tends to fall back into the path of the furrow opener or other implement tool there behind. Even when a pair of discs are used, assuming they effectively cut along spaced paths and displace the trash laterally in opposite directions, they still operate in opposition to each other. That is, the discs tend to pull the trash in opposite directions at the same time such that too often, neither disc can operate to avoid leaving too much trash across the path of the furrow opener. Even if each disc does in fact perform its slicing function, notwithstanding the opposite forces acting on the trash, cut material between the discs is not uniformly and consistently displaced out of the path of the furrow opener. The problems are not solved by any of the above-listed prior art or by any other prior art with which we are familiar.

In accordance with the instant invention, therefore, at least one of the pair of discs is undulated or provided with notches, presenting voids operating to preclude the above-mentioned opposition to cooperative action by preventing that disc from holding the trash against lateral displacement by the other disc. The operation is made effective by proper relative orientation of the discs, not only fore and aft but with respect to proper angularities in several directions which, at least in part, may be adjusted to suit varying conditions, in addition to adjustment for predetermining depth of penetration.

In the drawings

FIG. 1 is a perspective view of a pair of cooperating trash clearing discs made in accordance with my present invention showing the same attached to a beam or other support, illustrated fragmentarily, and forming a part of a planter or other implement;

FIG. 2 is an enlarged fragmentary top plan view of the attachment;

FIG. 3 is a fragmentary side elevational view of the attachment shown in FIG. 2;

FIG. 6 is a fragmentary top plan view of the beam shown in FIG. 1 showing only the connection to the beam of the suspension for the attachment; and FIG. 7 is a fragmentary cross-sectional view taken on line 7—7 of FIG. 6.

Figure 4:
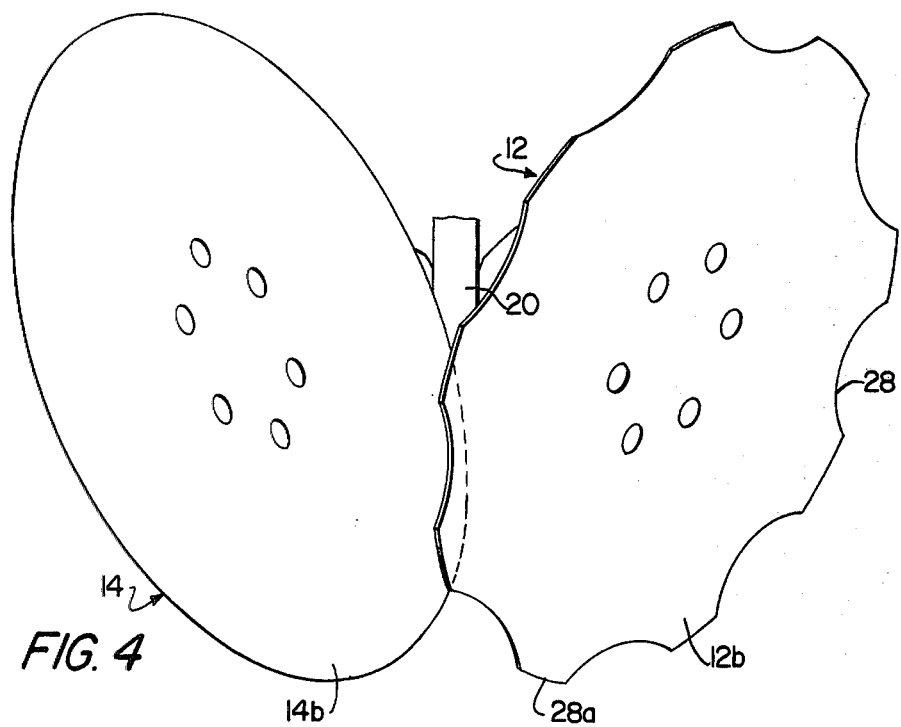
FIG. 4 is a fragmentary front elevational view of the attachment.
Figure 5:
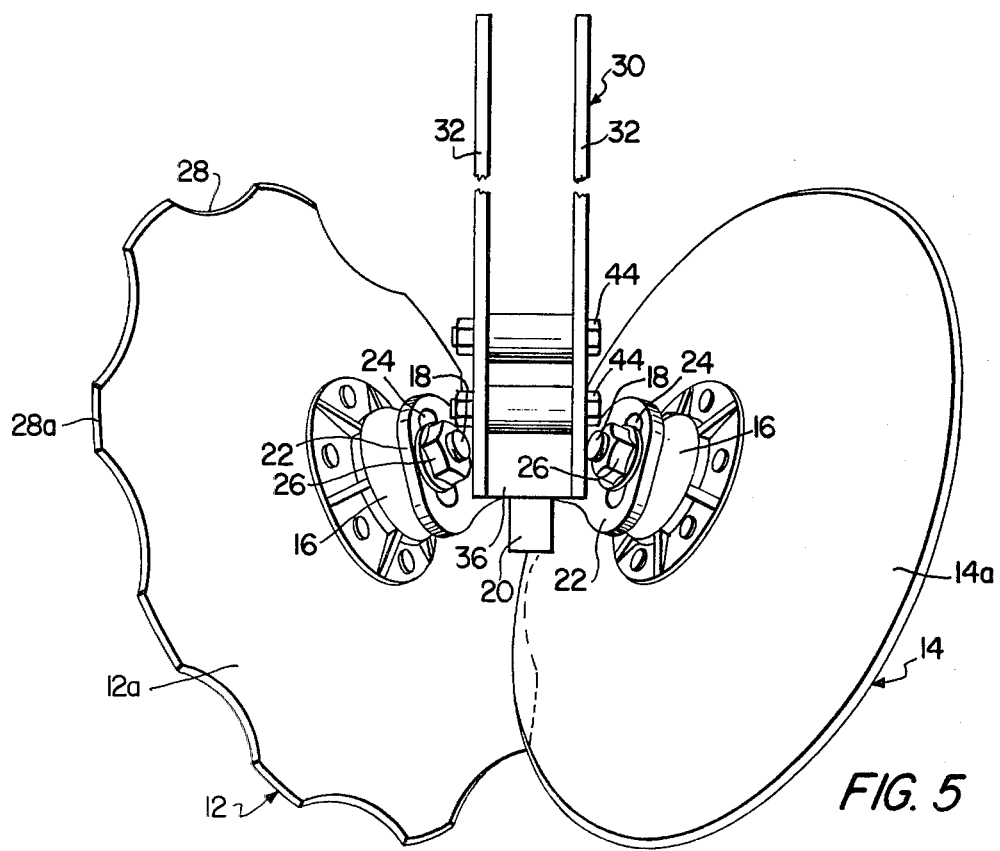
FIG. 5 is a rear elevational view of the attachment removed from the planter beam.

A beam 10 of a planter having a furrow-opener (not shown) supports a pair of convex-concavo discs 12 and 14, usually of equal diameters, ahead of the opener and below the beam 10. Each disc 12 and 14 has a sharpened circular periphery and their convex faces 12a and 14a are back to back such that their concave faces 12b and 14b are outermost.

The discs 12 and 14 each have a bearing, covered by a dirt shield 16 and a central axle 18, in the nature of a bolt, concentric with its periphery and extending outwardly beyond the faces 12a, 14a. An elongated, downwardly and forwardly inclined supporting bar 20, between the discs 12 and 14 and common thereto, is disposed in alignment with the path of travel of the implement and is provided with brackets 22 rigidly secured to its opposite upright surfaces.

The discs 12 and 14 converge toward said path of travel, the zone of convergence being forwardly of the bar 20, and the brackets 22 also converge as the leading end of the bar 20 is approached. The outward angle of each disc 12 and 14 may be from approximately 28° to approximately 34° at about 31° with respect to the fore and aft center line of the attachment. The angularity of the brackets 22 relative to the bar 20 is normally about 38°. One leg of each L-shaped bracket 22 has an elongated slot 24 that is inclined upwardly and forwardly as its upper end is approached for receiving the bolt 18. Nuts 26 on the bolts 18 clamp the shields 16 tightly against the brackets 22 for free rotation of the discs 12 and 14 in alignment with the axes of the bolts 18.

The self-cleaning disc 12 is fluted by virtue of the provision of a series of notches or peripheral voids 28 and the bracket 22 for the disc 12 is secured to the bar 20 ahead of and at a higher elevation than that of the bracket 22 for the disc 14 such as to place the disc 12 in leading and overlapped relationship to the disc 14 as well as spaced therefrom at the zone of convergence. Moreover, the surfaces of the slotted legs of the brackets 22 that are engaged by the shields 16 and the nuts 26 slope downwardly and inwardly as the lower ends of the slots 24 are approached such that the axes of rotation of the discs 12 and 14 are inclined downwardly and outwardly as their faces 12b and 14b are approached. Thus, by virtue of the double incline in the slots 24, the discs 12 and 14 may be independently or simultaneously adjusted to suit various operating conditions by loosening the nuts 26 and shifting the bolts 18 along the slots 24. The tilt of each disc 12 and 14 may be from about 18° to about 24° at approximately 21° with respect to vertical.

The discs 12 and 14 are peripherally beveled along their inner convex faces 12a and 14a to provide their sharp cutting edges therearound and, in the case of the disc 12, both the notches 28 and the alternating ribs 28a thereof are thus fully provided with such sharp cutting edges. Manifestly, by virtue of the notches 28, the disc 12 is, for the most part, better adapted to rotate constantly than the disc 12 but, on the other hand, it will not normally scoop out as much material from the furrow as the disc 14. We do not, however, suggest that this arrangement is necessarily best suited for all conditions. On the contrary, use of a pair of discs, both of the notched type, as in the case of the disc 12, might well better serve particular needs.

It is to be understood that our invention is especially adapted for use in connection with the so-called concept of "minimum tillage farming" which has become so widely accepted in recent years wherein crop residue is left on the land to reduce wind and rain erosion, improve fertility and retain moisture.

Therefore, the particular design, sizes and arrangement of parts, angularities and adjustments required will depend on such factors as types of soil; moisture; amount, dryness and nature of the residue; soil conditions; and the kind of implement in connection with which our invention is to be used. Wet, heavy, solid soils present somewhat different conditions than situations where prevailing clods, rocks or loose, dry dirt is to be removed in order to form the furrow.

Support for the bar 20 at preselected positions along the beam 10 includes a bifurcated suspension 30 having its perforated legs 32 embracing the beam 10 between a pair of interconnected clamps 34 releasably embracing the beam 10 and its short upright bight 36 secured directly to the rearmost end of the bar 20. A pin 38 passing through selected perforations 40 in the legs 32 (for determining the depth of soil penetration by the discs 12 and 14) rests upon the beam 10 and a block 42 beneath the beam 10, clamped between the legs 32 by bolts 44 holds the suspension 30 against upward movement relative to the beam 10.

In operation, during forward movement of the planter and its furrow opener suspended from the beam 10, the leading double disc attachment penetrates the soil at the zone of convergence of the discs 12 and 14 and rearwardly thereof to displace the soil and trash laterally in opposite directions, leaving a clean area between the discs 12 and 14 for the action of the furrow opener. Both of the discs 12 and 14 cut the debris, including grasses, weeds, root systems, clods of dirt and crop residue, and both discs 12 and 14 shift the debris outwardly.

However, the debris, for example cornstalks, which traverse the paths of the disc 12, is not held down tightly against the ground at the voids 28; therefore, all debris not actually cut by the disc 12 and pushed outwardly of concave face 12b is pulled away from the disc 12 by the disc 14 and deposited outwardly of the concave face 14b, all because of the voids 28 and their inability to work in opposition to the disc 14 insofar as debris displacement is concerned.

It is, however, significant to note that each of the discs 12 and 14 functions to both cut the debris and remove material from the furrow. In the case of the disc 12, each convex rib 28a performs a cutting action on the material over which it passes. If the cut is not complete, or if any debris is missed it is immediately received within the next succeeding notch 28 wherein the entire sharp concave edge of the notch 28 is effective to fully sever all material left by the preceding rib 28a.

The offset of the discs 12 and 14, placing the disc 12 ahead of the disc 14, should be at an approximate minimum of 1½ inches but can, under most conditions, be increased to as much as 2 inches. Moreover, it has been found that the best results can be produced if the disc 14 is set slightly lower than the disc 12 to an extent of about ½ inch.

For all practical purposes, the peripheral edge of the disc 14 may be disposed in relatively close proximity to the convex face 12a without actually touching, but normally a spacing not to exceed about ½ inch will not result in the passage of an excessive amount of trash between the discs 12 and 14 either above or below the point of minimum spacing which exists at a level well below the lowest level of the bar 20. Hence, each disc 12 and 14 overlaps the fore and aft center line of the attachment approximately ¼ inch. The diameter of discs 12 and 14 (which need not be identical) is about 12 inches, and can be decreased somewhat, but larger diameters are not too practical.

Having thus described the invention, what is claimed as new and desired to be secured by Letters Patent is:

1. In a farm implement having a furrow-opening tool thereon, an attachment for moving debris outwardly in opposite directions ahead of said tool, said attachment including:
    a pair of side-by-side convex-concavo discs having sharpened, circular peripheries adapted to penetrate the soil and disposed with their convex faces back to back,
    at least one of the discs being peripherally notched;
    a support between the discs and common thereto; and
    means for each disc respectively rotatably mounting the same on the support with the discs converging relatively toward the normal path of travel of said support and with notched disc leading the other disc,
    the discs being relatively overlapped at their zones of convergence and overlapping said path of travel at their zones of convergence.

2. The invention of claim 1, each mounting means including an L-shaped bracket, the brackets being secured to opposite upright surfaces of the support and converging toward the zone of convergence of the discs, one leg of each bracket having an elongated slot inclined upwardly and forwardly toward said zone of convergence of the discs, each disc having a releasable fastener holding the same in one of a number of selected positions along the corresponding slot.

3. The invention of claim 1, the axes of rotation of the discs being inclined downwardly and outwardly as their concave faces are approached.

4. The invention of claim 1, each mounting means being shiftable to any one of a number of preselected positions along an inclination extending upwardly and forwardly toward the zones of convergence of the discs; and means for each mounting means respectively holding the same in its preselected position.

5. The invention of claim 1; and releasable means for attaching the support to said implement.

6. The invention of claim 5, said releasable means having means for varying the height of the attachment.

7. A debris clearing unit for farm implements comprising:
    a pair of rotatable, side-by-side, convex-concavo discs having sharpened, circular peripheries and disposed with their convex faces back to back,
    said discs converging forwardly toward the center of their normal path of travel and downwardly toward the soil to be penetrated thereby,
    one of the discs leading the other disc and overlapping the latter at the forward zone of convergence of the discs, the minimum distance between the discs being at said zone of convergence and at a level below the level of the axes of rotation of the discs, both discs overlapping said center of their normal path of travel, each disc having means for raising and lowering the same in a direction inclined upwardly and forwardly.

8. The invention of claim 7, and means for raising and lowering said unit.

9. The invention of claim 8, said one disc being peripherally notched and normally disposed lower than said other disc.

* * * * *